US012649219B2

(12) United States Patent
Wagemann

(10) Patent No.: US 12,649,219 B2
(45) Date of Patent: Jun. 9, 2026

(54) ASSEMBLY DEVICE AND METHOD FOR ASSEMBLING COMPONENTS

(71) Applicant: HAVER & BOECKER OHG, Oelde (DE)

(72) Inventor: Jens Wagemann, Oelde (DE)

(73) Assignee: HAVER & BOECKER OHG, Oelde (DE)

( * ) Notice: Subject to any disclaimer, the term of this patent is extended or adjusted under 35 U.S.C. 154(b) by 0 days.

(21) Appl. No.: 17/595,664

(22) PCT Filed: May 20, 2020

(86) PCT No.: PCT/EP2020/064091
§ 371 (c)(1),
(2) Date: Nov. 22, 2021

(87) PCT Pub. No.: WO2020/239581
PCT Pub. Date: Dec. 3, 2020

(65) Prior Publication Data

US 2022/0219298 A1 Jul. 14, 2022

(30) Foreign Application Priority Data

May 29, 2019 (DE) ......................... 102019114564.3
May 29, 2019 (DE) ......................... 202019103065.8

(51) Int. Cl.
*B25B 27/06* (2006.01)

(52) U.S. Cl.
CPC .................................... *B25B 27/06* (2013.01)

(58) Field of Classification Search
CPC ......... Y10T 29/49696; Y10T 29/49698; Y10T 29/53796; Y10T 29/53848;
(Continued)

(56) References Cited

U.S. PATENT DOCUMENTS 4,979,279 A * 12/1990 Garvey .................. B23P 11/00
72/391.2
5,317,793 A * 6/1994 Boyd .................... F16C 11/045
29/281.1
(Continued)

FOREIGN PATENT DOCUMENTS

DE 7918506 U1 10/1979
DE 202004017837 U1 * 2/2005 ........... B25B 27/062
(Continued)

OTHER PUBLICATIONS

Translation of DE 202004017837 U1 (Year: 2005).*
(Continued)

*Primary Examiner* — David S Posigian
*Assistant Examiner* — Steven Huang
(74) *Attorney, Agent, or Firm* — Greer, Burns & Crain, Ltd

(57) ABSTRACT

An assembly device for pressing and/or retracting components into an opening in a housing part and/or for sliding on and/or pulling off components, including a base body and a counterpart, the base body has a receiver for receiving the counterpart, a tube with a contact section, the tube is slid in sections over the base body, and the tube and the base body are displaceable relative to each other by of at least one actuator so that the distance is variable between the contact section and the receiver. In a method, a component is arranged in front of one side of an opening, the counterpart is passed from the other side of the opening through the opening and the component, the counterpart is connected to the base body via the receiver, and the distance between the contact section and the receiver is changed by the actuator to press in the bearing.

22 Claims, 8 Drawing Sheets

(58) Field of Classification Search
CPC .... Y10T 29/53822; B66F 17/00; B23P 11/00; B25G 1/043; B25G 3/16; B25G 3/26; B25B 27/06; B25B 27/062; B25B 27/064; B25B 27/02; B25B 27/023; B25B 27/026; B25P 19/02; B25P 19/024
USPC ....... 29/221.6, 238, 239, 243.523, 252, 255, 29/278, 280; 254/89 H, 39 R
See application file for complete search history.

(56) References Cited

U.S. PATENT DOCUMENTS

| | | | | |
|---|---|---|---|---|
| 5,402,560 | A * | 4/1995 | Rode | B25B 27/064 29/282 |
| 5,406,685 | A * | 4/1995 | Harmand | B25B 27/06 29/255 |
| 6,079,092 | A * | 6/2000 | Bannerman | B25B 27/064 29/252 |
| 10,179,397 | B1 * | 1/2019 | Hunter | F04B 53/1087 |
| 10,265,839 | B1 | 4/2019 | Hunter | |
| 2002/0096209 | A1 * | 7/2002 | Danielson | F16L 55/18 137/15.09 |
| 2011/0173814 | A1 * | 7/2011 | Patel | F04B 53/1087 29/890.121 |
| 2016/0128242 | A1 | 5/2016 | Wu et al. | |

FOREIGN PATENT DOCUMENTS

| | | | |
|---|---|---|---|
| DE | 102004051059 | B4 | 8/2006 |
| DE | 102005061498 | A1 | 7/2007 |
| GB | 283051 | A * | 1/1928 |
| KR | 101605798 | B1 | 3/2016 |
| WO | 2018066010 | A1 | 4/2018 |
| WO | 2020239581 | A1 | 12/2020 |

OTHER PUBLICATIONS

Search Report received for German AppIn No. 102019114564.3 dated Apr. 27, 2021.
International Search Report and Written Opinion received for PCT/EP2020/064091, mailed Sep. 18, 2020.
Chinese Search Report with partial translation for corresponding Chinese Patent Application No. 2020800393659 dated Feb. 29, 2024 (5 pages).
Chinese First Office Action with translation for corresponding Chinese Application No. 2020800393659 dated Mar. 4, 2024 (9 pages).
Brazilian Patent Application [BR112021023907-3]: Machine translation of Search Report dated Apr. 15, 2024 (8 pages).
European Patent Application [20 731 801.5-1017]: Machine translation of Office Action dated Aug. 7, 2024 (11 pages).
Chinese Patent Application [202080039365.9]: Machine translation of Office Action dated Sep. 30, 2024 (12 pages).

* cited by examiner

ASSEMBLY DEVICE AND METHOD FOR ASSEMBLING COMPONENTS

BACKGROUND

The present invention relates to an assembly device, in particular for pressing components such as bearings and/or for retracting components such as shafts into an opening provided for this purpose in a housing part or the like and/or for sliding on and/or pulling off components. The assembly device comprises at least one base body, at least one counterpart and at least one tube means. The present invention further relates to two methods for operating such an assembly device.

In plants, machines and vehicles with moving parts, bearings are frequently pressed into openings provided for this purpose or driven in with sleeves shaped accordingly for this purpose. Depending on the design, shafts are subsequently driven into these bearings to provide moving parts for certain motion sequences.

The pressing of bearings into openings provided for this purpose is regularly carried out with special impact sleeves. Alternatively, tools are often used, which usually comprise a threaded rod. This threaded rod is then passed through the opening in a carrier or other housing part into which the bearing is to be pressed. The bearing is then slipped on and a press plate is slid on from each side. Subsequently, nuts are then screwed on, which move the two press plates further and further towards each other until the bearing is pressed into the opening.

Pressing in bearings using such tools works reliably in principle. However, it is quite laborious to assemble the tools and it takes a relatively long time to press in bearings. Driving by impact involves certain risks of damage as well as a risk of injury and is also time-consuming.

Once a bearing is pressed in, a shaft is then driven into the pressed-in bearing, depending on the type of machine, equipment or vehicle and depending on the application. This also takes a long time, is strenuous, and the shaft, bearing, and/or other components can be damaged relatively quickly.

If the shaft also has to be supported on the opposite side, it is not possible to press in the bearing on this side first and then drive in the shaft since in this case, the shaft is usually already inserted into the opening. On the opposite side, therefore, the bearing usually has to be driven onto the shaft and pressed or driven into the opening at the same time. This is also time-consuming and can easily lead to damage.

It is therefore the object of the present invention to simplify the pressing-in and/or retracting of components, to speed it up and preferably to make it more reliable.

SUMMARY

The assembly device according to the invention is particularly suitable for the assembly but also for the disassembly of components. The assembly device according to the invention is particularly suitable for pressing in components such as bearings, shaft sealing rings, coupling parts, etc. and/or for retracting components such as shafts into an opening provided for this purpose in a housing part or the like, and/or for sliding on and/or pulling off components. In this case, the assembly device comprises at least one base body and at least one counterpart. The base body has at least one receiving means for receiving the at least one counterpart. Furthermore, the assembly device comprises at least one tube means with at least one contact section, wherein the tube means is slid over the base body at least in sections. The tube means and the base body or, respectively, the tube means and the receiving means are displaceable relative to each other by means of at least one actuator means, so that the distance between the contact section of the tube means and the receiving means is variable.

Due to the components being displaceable relative to each other or due to the fact that the distance between the contact section and the receiving means is changed, the tube means and the base body or the receiving means are displaced relative to each other so that the contact section presses against the component to be assembled and thus transmits a force or is supported relative to the housing part so that the component to be assembled is pulled.

As previously explained, the assembly device is used to assemble components. However, it is also possible to disassemble components such as bearings that have been assembled by means of the assembly device, or to pull off components.

Preferably, the tube means and the base body interact with each other in the manner of a sliding fit. It is thus possible for the tube means to be guided at least in sections on the base body and to slide over it when the distance is changed.

The actuator means serves to change the distance between the contact section of the tube means and the receiving means, wherein the actuator means can in particular be part of a handling means, which in particular is configured to be mobile.

For example, a cordless screwdriver or also a hydraulic device in the manner of a hand tool can be used to provide a suitable actuator means.

The counterpart provides in particular a kind of tie rod, which is either attached to a component to be retracted or is used as a counter bearing for pressing in components.

The contact section of the tube means is used to support the tube means on the housing part when it is being retracted and to transmit force to this component when a component such as a bearing is being pressed in. Depending on the intended use, the contact section is therefore adapted in diameter so that it can either extend into the opening into which a bearing is to be pressed and/or is supported against the housing part outside the opening.

In all configurations, it is preferred that all components of the assembly device according to the invention are matched to one another and designed in such a way that the rules of professional assembly are followed.

The assembly device according to the invention offers many advantages. One considerable advantage is that by means of the assembly device according to the invention, the assembly of components such as, for example, the pressing-in of bearings or the retracting of shafts is considerably facilitated and accelerated.

In addition, by means of the assembly device according to the invention, there is no longer any risk of damage to the components when shafts are retracted or bearings are pressed in, since due to the simple handling of the assembly device and the application of force by means of the actuator means, the components can be inserted in a targeted manner.

Furthermore, the installation of the assembly device, i.e. the insertion of the counterpart into the receiving means, is also very simple and there is no need for time-consuming assembly of tool parts.

Another significant advantage of the assembly device according to the invention is that a user can perform the necessary steps for pressing in, retracting or the like in a much more ergonomic manner. Furthermore, damage to components and/or injury to the user by impact tools is ruled out.

In addition, the noise emission is substantially lower when using the assembly device according to the invention, at least compared to conventional driving in of components.

Preferably, the tube means can be displaced at least in sections beyond the receiving means. This can be achieved by pushing the tube means in the direction of the housing part into which a component is to be pressed or retracted. In preferred configurations, the receiving means can also be retracted relative to the tube means to receive the counterpart. In both cases, however, it is preferred that the tube means be displaced relative to the receiving means, with the tube means projecting or being displaced at least in sections beyond the receiving means.

Particularly preferably, the receiving means is detachably and/or exchangeably received on the base body. Depending on the configuration, however, the receiving means can also be manufactured integrally with the base body or be non-detachably connected thereto. In the case of a detachable and/or exchangeable configuration of the receiving means, different receiving means can be provided depending on the intended use. They are preferably connected to the base body in such a way that sufficient force absorption can be achieved.

In advantageous configurations, the inner diameter of the tube means is adapted at least in sections to at least one outer diameter of the base body and/or the receiving means and/or the counterpart. It is particularly preferred here that the inner diameter of the tube means is also adapted to the diameter of the component to be assembled, such as a shaft or a bearing. Thus, depending on the configuration, the tube means can be slid over the component at least in sections, if required.

Preferably, the counterpart comprises at least one cross-section as a centering projection and/or as a stop. By means of such a centering projection, the counterpart can be received centered in the opening in a housing part and thus ensure a defined insertion of components. The maximum pressing-in depth can be specified via such a stop or depth stop. When pressing in a bearing, the cross-section of the centering projection preferably corresponds to the cross-section of the opening and thus to the outer diameter of the component.

Particularly preferably, the counterpart comprises at least one section which serves as a centering aid for the component to be assembled. For example, when pressing in bearings, the counterpart can be guided through the opening in the housing part and the bearing can be slid onto the centering aid in front of the opening.

In practical configurations, the receiving means is connected to the base body via at least one locking means. In particular, locking can be carried out by means of a locking pin, which is inserted into corresponding openings in the base body and the receiving means. In order to securely receive the pin, the locking pin can be locked. For this purpose, a groove can preferably be provided in the locking pin in which preferably a spring-mounted locking pin engages. In other configurations, the connection by means of a locking means can also be made by using a bolt or the like.

Preferably, the base body is configured to be tubular at least in sections. In particular, a round or roundish contour is preferred here, with the contour of the tube means preferably being adapted at least in sections to the contour of the base body.

Particularly preferably, the base body is formed to be rotatable or is rotatably received at least in sections. Particularly preferred is a rotation about the longitudinal axis of the base body so that the base body can be aligned in different orientations, for example, on the handling device.

In practical configurations, the actuator means comprises at least one pressure cylinder and/or at least one worm drive and/or at least one threaded rod and/or other means for generating a linear movement. Other suitable drives can also be advantageously used.

Preferably, the pressure cylinder and/or the worm drive and/or the threaded rod is arranged at least in sections in the base body. Such a configuration allows a concealed or covered drive, so that a particularly safe operation of the assembly device is achieved. In addition, a compact device can also be provided.

Preferably, at least one recess is provided in the base body through which the actuator means enters into operative connection with the tube means. In advantageous configurations, the recess is formed to be substantially slot-like so that a kind of sliding fit is formed.

Preferably, at least one recess corresponding at least in sections is provided in the tube means, via which recess the tube means is connected to the actuator means, in particular via at least one coupling element. For example, the tube means can be slid over the base body, wherein a coupling element provides the connection between actuator means and tube means as soon as the recesses in the base body and in the tube means are sufficiently superimposed. A coupling element can be provided, for example, by a bolt.

Preferably, the recess in the tube means is substantially formed as a slot at least in sections.

In particular, when the recess in the tube means is formed as a slot, it is preferred that at least one first engagement section and at least one second engagement section are provided in the recess. In this way, the adjustment travel or stroke of the tube means can be adapted and extended as required. In this case, the at least two engagement sections can be provided in the manner of a bayonet adjustment mechanism, so that the respective engagement sections are adjusted by displacing the tube means and a rotating and/or pivoting process.

Preferably, the counterpart comprises at least one plate. By means of such a plate, for example, a tie rod can be provided when pressing bearings into an opening in a housing part, which tie rod is supported on the bearing and/or on the housing part. In particular, the plate can be supported on the housing part so that, for example, a tensile force is created between the receiving means and the counterpart when the tube means is extended.

In practical configurations, the counterpart comprises at least one attachment means. In such a configuration, the counterpart can be fixed to a component by means of an attachment means. For example, the counterpart can be fixed to a shaft to be retracted by means of a bolt or the like, so that the counterpart also acts here as a tie rod for the component to be retracted.

Preferably, the counterpart and/or the receiving means comprise at least one connecting means. Such a connecting means is used in particular for quickly connecting the counterpart to the receiving means. In this case, a connection can be made in particular by a snapping-in, hooking-in, plugging-in, driving-in, screwing-in or other rapid way of connecting, in particular without the use of tools.

In practical configurations, the counterpart comprises at least one quick-release fastener. In such a configuration, the counterpart can in particular comprise, for example, a threaded rod onto which a plate can be slid, or which comprises a rod. Furthermore, at least one quick-change nut or the like is preferably provided, so that a particularly fast fixing and adjustment can be carried out.

Preferably, at least one fitting is provided, by means of which in particular at least one cross-section and/or at least one contour can be adapted, e.g. for different bearing and/or component diameters. Such a fitting can be configured, for example, in the form of a sleeve which, according to the requirements, can have a certain outer cross-section and/or inner cross-section and/or a certain contour. Such a fitting preferably cooperates with the contact section of the tube means or provides a new contact section or pressing section. Thus, the fitting can be supported against the contact section of the tube means, wherein preferably a corresponding receptacle is also provided on the tube means, onto which, for example, the fitting can be slid on. The fitting is preferably fixed to the tube means so that it cannot fall off when the assembly device is in use. Here too, a quick-release fastener or connection can be provided, for example, a spring-loaded pressure piece can be provided which effects a secure but releasable connection of the fitting to the tube means. Other locking means can also be advantageously used.

Preferably, the fitting has at least one recess. This recess serves in particular as access to the receiving means for the counterpart. For example, the counterpart can be inserted into the receiving means through the recess. Subsequently, depending on the configuration, the fitting can also serve as a locking means, for which purpose it is rotated, for example, so that the access to the receiving means is no longer free, so that the counterpart inserted into the receiving means can temporarily no longer be removed from the receiving means.

The method according to the invention is suitable for pressing a component such as a bearing into an opening in a housing part by means of an assembly device as described above. In doing so, the following steps are carried out in a suitable sequence. A bearing is arranged in front of one side of an opening of a housing part. Furthermore, the counterpart is passed from the other side of the opening through the opening and the bearing. Alternatively, the counterpart can also be passed through the opening from the side of the bearing. The counterpart is connected to the base body via the receiving means. The distance between the contact section and the receiving means is changed by means of the actuator means in order to press in the bearing. In particular, the distance can be achieved by extending the tube means, whereby the tube means presses against the bearing and pushes it into the opening. In doing so, the counterpart serves as a counter bearing.

Preferably, the actuator means is then retracted and the tube means is moved back, for example manually, so that the connection between the counterpart and the receiving means can be released so that the assembly device can be removed again from the housing part.

In other configurations, however, the receiving means with the counterpart inserted can also be retracted relative to the tube means, whereby in this configuration too, the tube means is displaced beyond the receiving means or the base body in the direction of the housing part and thus press-fits the bearing.

The method of pressing in components according to the invention also offers the advantages already explained above.

Preferably, the following steps are carried out at a suitable point in a suitable sequence. The actuator means is moved back. The tube means is rotated and the second engagement section is inserted. This is followed by a further change in the distance between the contact section and the receiving means by means of the actuator means. These method steps are particularly suitable if the stroke or movability predetermined by the actuator means and/or the handling means is not sufficient to effect a sufficient change in distance between the tube means and the receiving means. This can be very useful, for example, in order to keep the actuator means as small as possible, since it is preferably a hand-guided device which might otherwise become too bulky. Thus, if too little stroke is achieved, the actuator means can be moved back and the tube means can be switched from the first engagement section to the second engagement section so that, depending on the configuration, further changing of the distance between the receiving section and the tube means becomes possible. Thus, depending on the configuration, the stroke can be extended. If several engagement sections are provided, this can be repeated according to the number of engagement sections, depending on the configuration.

Subsequently, the actuator means can be moved back, preferably setting the tube means back to the first engagement position or in the first engagement section.

The method according to the invention for retracting components such as a shaft into an opening of a housing part by means of an assembly device as previously described is characterized by the following steps of a suitable sequence. The counterpart is attached to the component or to the shaft. The shaft or the component with the attached counterpart is passed through a corresponding opening in a housing part. Depending on the configuration, only the counterpart is initially passed through the opening. The counterpart is connected to the base body via the receiving means, and the distance between the contact section and the receiving means is changed by means of the actuator means in order to retract the shaft or the component.

Preferably, the cross-section of the counterpart is at least slightly smaller than the cross-section of the opening and/or the component, so that a sliding and/or push fit is created, which preferably serves as a centering and/or assembly aid.

This method according to the invention also offers the advantages as explained previously with respect to the assembly device.

The change in the distance between the tube means and the receiving section can be effected in particular by extending the tube means and/or retracting the receiving means.

After carrying out the method or after retracting the shaft, the actuator means is preferably moved back and the tube is displaced back manually or even automatically so that the counterpart can be removed again from the receiving means. Preferably, the counterpart is removed from the component or the shaft after retracting has taken place.

Preferably, the method further optionally comprises the following steps at a suitable point in a suitable sequence. The actuator means is moved back. The tube means is rotated and the second engagement section is adjusted. This is followed by further changing the distance between the engagement section and the receiving means by means of the actuator means. As before for pressing in a component such as a bearing into an opening, the additional method steps also serve to compensate for any insufficient stroke or insufficient adjustability by changing the engagement sections on the tube means.

The methods described above can also be used analogously to remove or pull off components or, for example, to press a bearing into a corresponding opening in a housing part if a shaft is already being passed through this opening. For this purpose, the counterpart is attached to the shaft that is already passed through the opening in the housing part. Then the bearing to be slid on or pressed in is guided at least in sections via the counterpart and the counterpart is connected to the receiving means or to the base body. Subsequently, by changing the distance between the receiving means and the tube means, the bearing is slid or pressed over the shaft and then into the opening, with the counterpart serving here as a tie rod and absorbing the force to be applied to the shaft.

BRIEF DESCRIPTION OF THE DRAWINGS

Further advantages and features of the present invention result from the exemplary embodiment which is explained below with reference to the accompanying figures.

In the figures.

DETAILED DESCRIPTION

Figure 1:
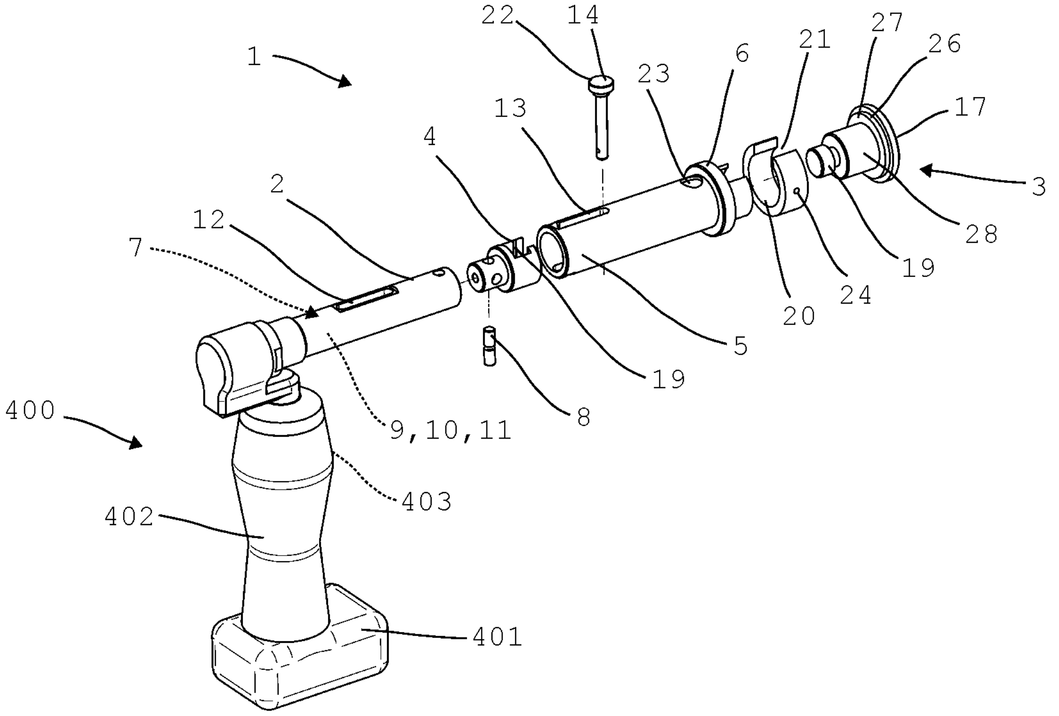
FIG. 1 shows a purely schematic illustration of an exemplary embodiment of an assembly device according to the invention in an exploded view.

FIG. 1 shows a purely schematic perspective exploded view of an assembly device 1 according to the invention. The assembly device 1 according to the invention is particularly suitable for pressing in components 100 such as, for example, bearings 100 and/or for retracting components 200 such as, for example, shafts 200 and/or for sliding on and/or pulling off components such as, for example, radial shaft seals, coupling parts etc.

In this context, the assembly device 1 according to the invention comprises a base body 2 which, in the exemplary embodiment shown here, is formed in a substantially tubular manner. A receiving means 4 for a counterpart 3 is provided on this base body 2, wherein the receiving means 4 is provided in the exemplary embodiment shown here as a separate part which can be connected here to the base body 2 by means of a locking device 8.

In the exemplary embodiment shown here, the base body 2 is connected to a handling means 400 or is provided by a part of this handling means 400.

Here, the handling means 400 in the exemplary embodiment shown has a rechargeable battery 401, so that the assembly device 1 can be operated in a mobile manner even without a cable- and/or hose-based power supply.

An actuator means 7 is arranged within the base body 2, which in the exemplary embodiment shown here is also provided by the handling means 400. In the exemplary embodiment shown here, the actuator means comprises a pressure cylinder 9 and/or a hydraulic system 9. However, in other configurations, instead of the pressure cylinder and/or instead of the hydraulic system, a worm drive 10 and/or a threaded rod 11 and/or other means for generating a linear movement can additionally or alternatively be provided.

All necessary components for extending the pressure cylinder 9 within the base body 2, such as, for example, electric motor, hydraulic pump, control valves, etc. are arranged here in the handle 402 of the handling means 400, wherein the pressure cylinder 9 can be extended by means of an actuating element 403. In the exemplary embodiment shown here, the handle 402 thus provides the drive or the housing for the drive for the actuator means 7.

The assembly device 1 further comprises a tube means 5, which can be slid over the base body 2 at least in sections. A recess 12 is provided in the base body 2 via which recess the actuator means 7 can enter into operative connection with the tube means 5 slid onto the base body 2.

A recess 13 is provided in the tube means 5, which is provided such that it corresponds to the recess 12 in the base body 2. If the tube means 5 is slid over the base body 2, an operative connection can be established between the actuator means or pressure cylinder 9 and the tube means 5 by means of a coupling element 14, in the exemplary embodiment shown here by means of a bolt 22. If the actuator means 7 is actuated or if the pressure cylinder 9 is extended, the tube means 5 is pushed forward via the coupling element 14.

The tube means 5 comprises a contact section 6 with which, for example, a bearing 100 can be pressed in, or which is supported against the housing part 300 when retracting a shaft. Depending on the exemplary embodiment, a fitting 20 can be provided which is supported against the contact section 6. Different contours and cross-sections or diameters can be adapted via such a fitting 20.

The receiving means 4 serves to receive the counterpart 3, wherein the counterpart 3 acts in particular as a tie rod. The counterpart 3 and/or the receiving means 4 have a connecting means 19 which enables a quick and reliable connection between counterpart 3 and base body 2 via the receiving means 4. In the exemplary embodiment shown, the counterpart 3 can simply be hooked in the connecting means 19 into the receiving means using a correspondingly configured connecting means 19.

In the exemplary embodiment shown, the tube means 5 has different inner diameters. The diameter of the receiving means 4 in the exemplary embodiment shown here is larger than the diameter of the base body 2. In order that the tube means 5 can nevertheless be displaced both over the base body 2 and over the receiving means 4, the tube means 5 is first slid over the base body 2. Subsequently, the receiving means 4 is inserted into a corresponding opening in the base body 2. The locking means 8 can then be inserted via the opening 23 in the tube means 5 so that the receiving means 4 is securely connected to the base body 2. In addition, the tube means 5 is secured against accidental dropping.

In the exemplary embodiment shown here, the counterpart 3 comprises a plate 17 which is supported as a tie rod against the housing part 300 when a component is retracted. Furthermore, the counterpart 3 here comprises a centering projection 26 via which the counterpart 3 can be inserted into the opening 301 in a defined manner.

Furthermore, in the exemplary embodiment shown here, the centering projection 26 serves as a stop or depth stop 27. Via this stop 27 it is achieved that a component 100 or bearing can be assembled in a defined manner since the press-in depth is limited.

FIG. 1 also shows that the counterpart 3 has a centering aid 28 for the component 100. Thus, for example, when pressing in a bearing 100, the bearing 100 can first be attached or slid onto the centering aid 28 passed through the opening 301. The component 100 pre-positioned in this way can then be pressed in in a defined manner by means of the assembly device 1.

Figure 2:
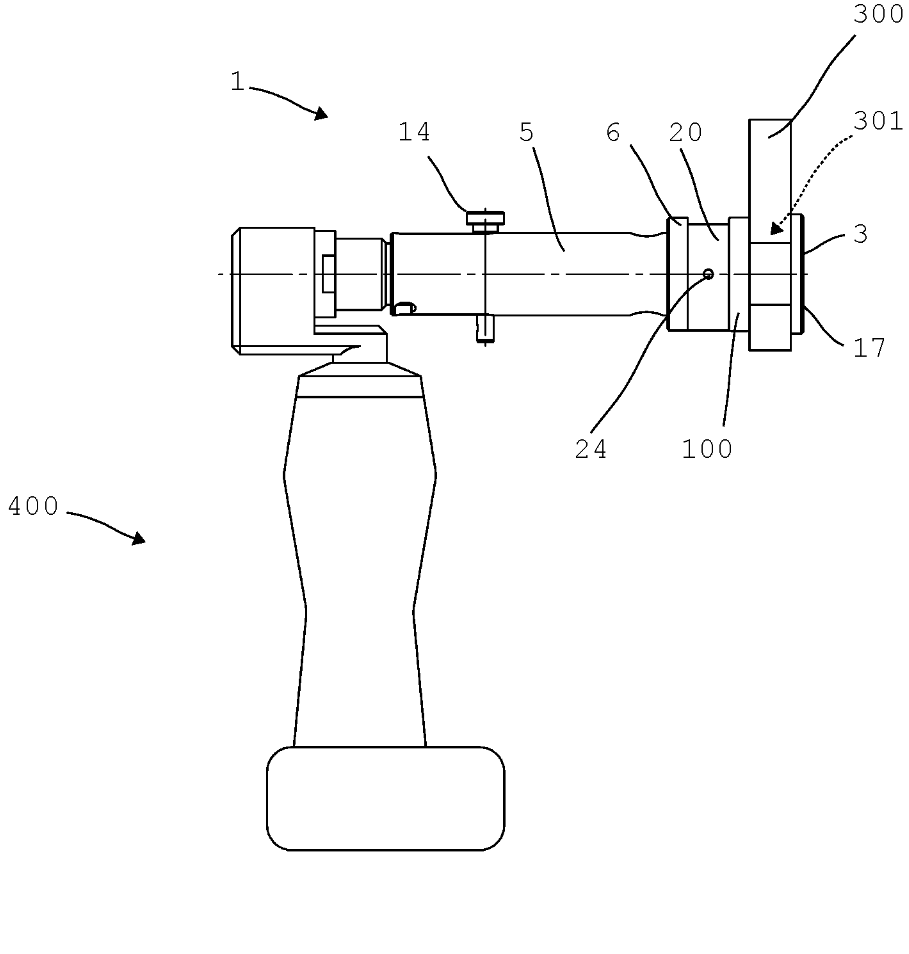
FIG. 2 shows a purely schematic illustration of an exemplary embodiment of an assembly device according to the invention in a side view when retracting a bearing into a housing part.

FIG. 2 purely schematically shows how a component 100, in this case a bearing 100, is pressed in. For this purpose, the bearing 100 is arranged in front of the one side of the opening 301, wherein the counterpart 3 in the exemplary embodiment shown here is inserted from the other side of the opening 301 in the housing part 300 through the opening 301 and through the bearing 100.

The counterpart 3 is then hooked into the receiving means 4, wherein a fitting 20 is provided here which adapts the contact section 6 to the size of the bearing 100. In order that the counterpart 3 can be inserted into the receiving means 4 despite the fitting 20, a corresponding recess 21 is provided in the fitting 20. To prevent the fitting 20 from falling off the tube means 5, a locking means 24 is also provided here, which is designed here as a spring-loaded pressure piece. Other types of locking means can also be used in a useful and suitable manner to receive the fitting 20 securely on the tube means 5.

If the actuator means 7 in the exemplary embodiment shown here is now actuated, the pressure cylinder 9 is extended forwards, thus in the direction of the receiving means 4, whereby the tube means 5 is pushed forwards by the coupling of the actuator means 7 via the coupling element 14. As a result, the tube means 5 and the base body 5 or the receiving means 4 are displaced relative to each other so that the distance between the contact section 6 and the receiving means 4 is changed.

In doing so, the tube means 5 in the exemplary embodiment shown here moves forward over the receiving means 4 so that the distance between the contact section 6 and the counterpart 3 or the plate 17 of the counterpart 3 is reduced. Hereby, a pressing force is exerted on the bearing 100 so that the bearing is pushed into the opening 101 of the housing part 300.

Figure 3:
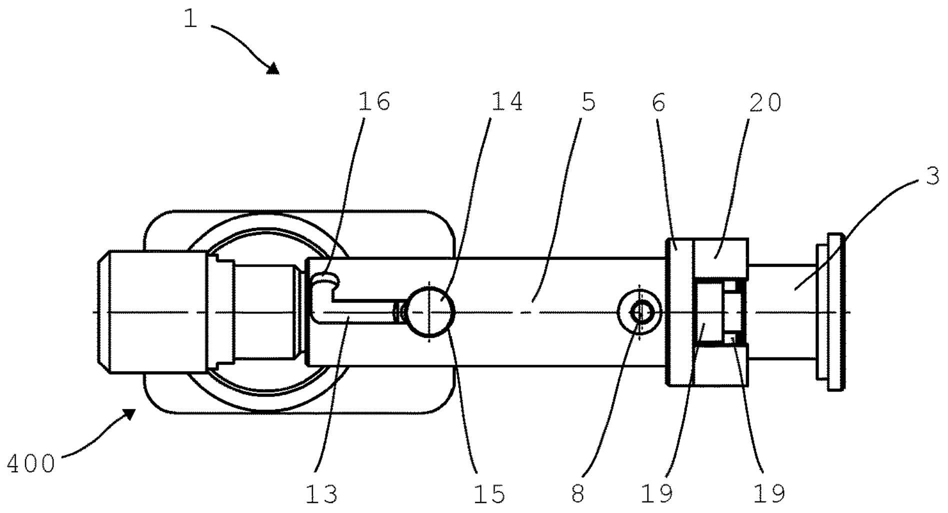
FIG. 3 shows a purely schematic illustration of an exemplary embodiment of an assembly device according to the invention in a top view.

FIG. 3 shows a purely schematic top view of an assembly device 1 according to the invention. Here too, it can be seen that the counterpart 3 is received in the receiving means 4 by means of a connecting means 19. Furthermore, it can be seen that a recess 13 is provided in the tube means 5, which recess has a first engagement section 15 and a second engagement section 16. Thus, a kind of a bayonet adjustment mechanism is provided.

This serves to increase the stroke of the tube means 5 in the exemplary embodiment shown here in two steps if the available stroke of the actuator means 7 or the pressure cylinder 9 is not sufficient. For this purpose, the tube means 5 is first brought into contact with the coupling element 14 by means of the first engagement section 15. The actuator means 7 is then actuated so that the pressure cylinder 9 extends.

If the stroke of the pressure cylinder 9 is not sufficient, the pressure cylinder or the actuator means 7 can be moved back, whereby the coupling element 14 also moves back. In this case, the retraction in the exemplary embodiment shown here is effected by a spring reset.

Now, the tube means 5 can be rotated so that the second engagement section 16 comes into contact with the coupling element 14. Now, the actuator means 7 can be actuated again so that the double stroke is available due to the embodiment of the tube means 5 with an engagement section 15 and a second engagement section 16. Depending on the configuration, it is also possible to work with even more engagement sections so that a desired stroke or displacement of the tube means 5 can be achieved.

Figure 4:
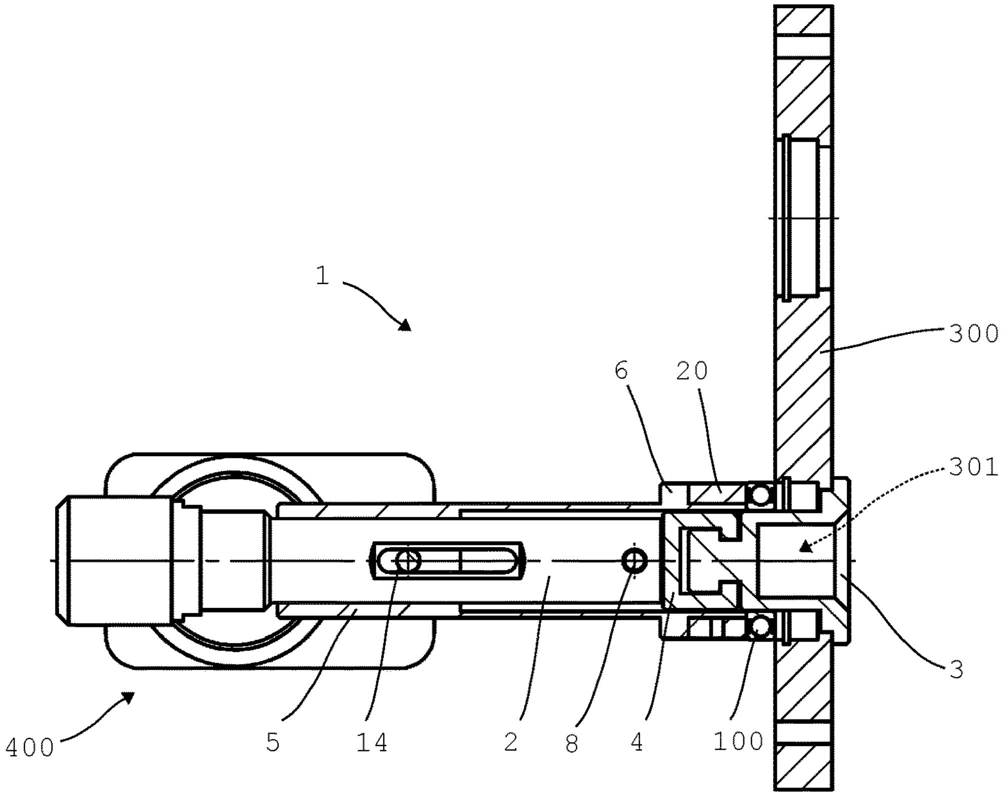
FIG. 4 shows a purely schematic illustration of an exemplary embodiment of an assembly device according to the invention when retracting a bearing into a housing part in a sectional view from above.
Figure 5:
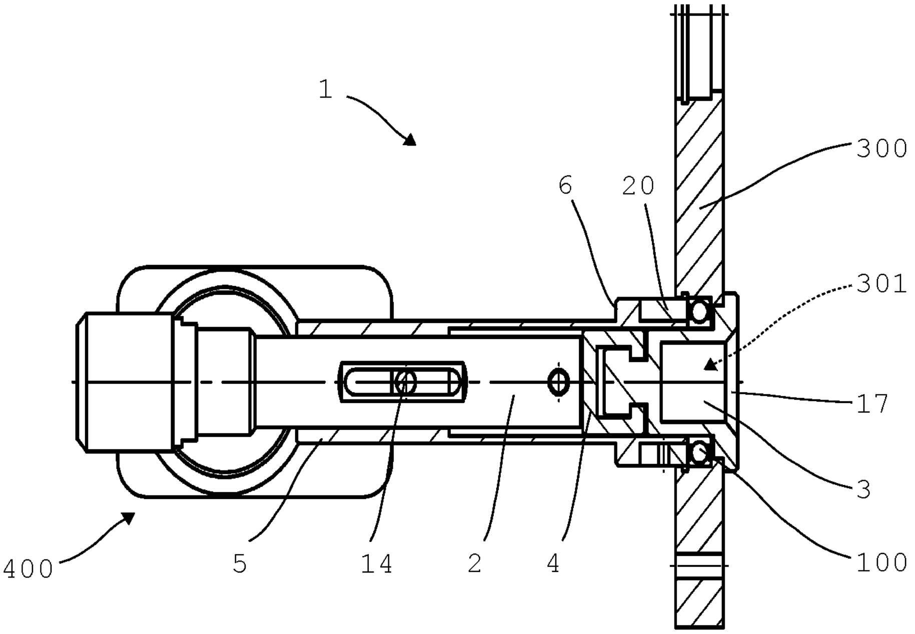
FIG. 5 shows a purely schematic illustration of an exemplary embodiment of an assembly device according to the invention when retracting a bearing into a housing part in a sectional view from above.
Figure 6:
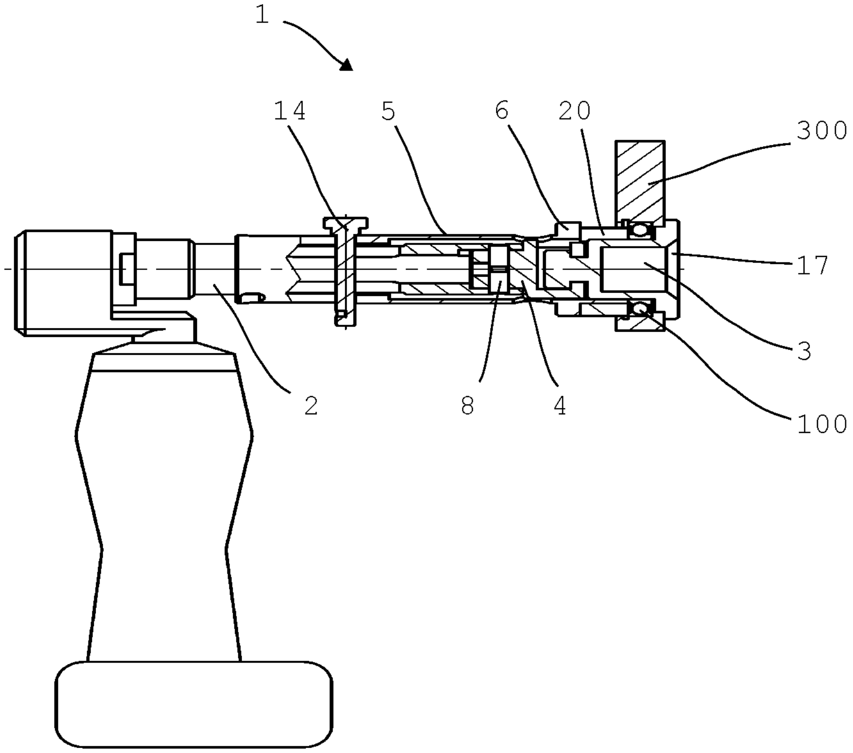
FIG. 6 shows the view according to FIG. 5 with the bearing completely retracted.

FIGS. 4 to 6 show in purely schematic sectional views the pressing of a bearing 100 into an opening 301 in a housing part 300. In FIG. 4, the bearing 100 is still positioned in front of the opening 301. In the two views according to FIGS. 5 and 6, the bearing 100 is already fully pressed into the opening 301 of the housing part 300.

In this case, the position of the tube means 5 relative to the receiving means 4 can be seen in particular via the position of the coupling element 14 and the contact section 6. As can be seen in FIGS. 5 and 6, compared to the initial situation of the assembly device 14, the tube means 5 is pushed forward beyond the receiving means 4. As a result, the distance between the contact section 6 and the plate 17 of the counterpart 3 serving as a tie rod changes. Hereby, the bearing is optimally pressed into the opening 301.

Since the movement of the tube means 5 is effected here by means of a handling device and in particular by means of a hydraulic system, a particularly simple and rapid pressing-in of a bearing or a component 100 is achieved. Complicated handling using threaded rods and nuts is not necessary. It is also not necessary to drive in the bearing, which is relatively difficult since it requires to work relatively carefully so as not to damage the bearing.

Figure 7:
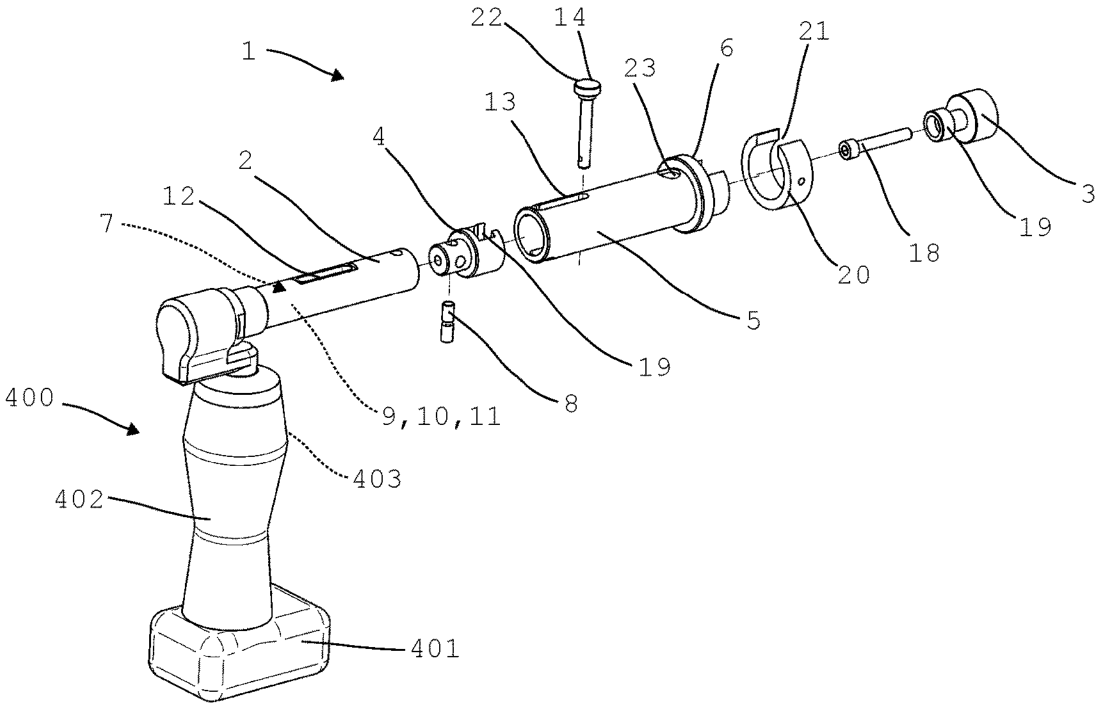
FIG. 7 shows a purely schematic illustration of a further exemplary embodiment of an assembly device according to the invention in an exploded view.

In FIG. 7, a further exemplary embodiment of an assembly device 1 according to the invention is shown purely schematically in a perspective exploded view. In contrast to the exemplary embodiment according to FIG. 1, the counterpart 3 in this case does not have a plate 17 or an abutment but rather an attachment means 18.

Such an exemplary embodiment of an assembly device 1 according to the invention with a counterpart 3 configured in this way can be used in particular for retracting components 100 such as shafts 200. However, with an assembly device 1 configured in this way, it is also possible that components can be slid over other components and/or slid over other components and simultaneously and/or subsequently pressed into an opening.

Figure 8:
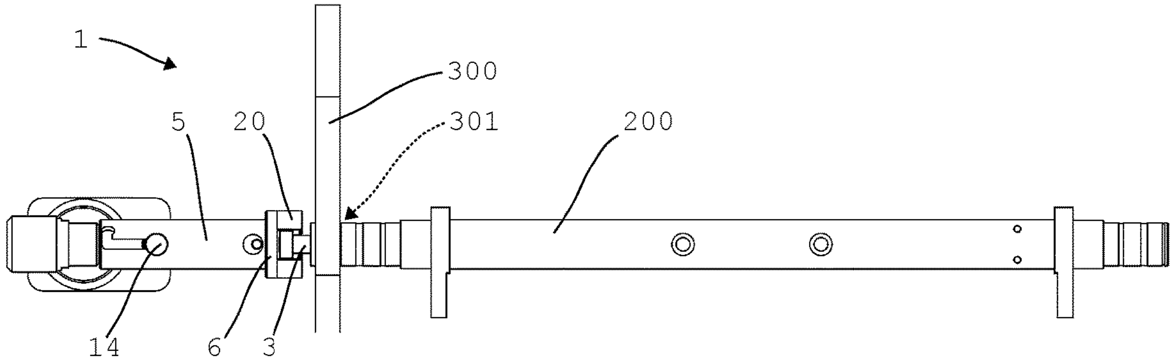
FIG. 8 shows a purely schematic illustration of an exemplary embodiment of an assembly device according to the invention when retracting a shaft into a housing part in a view from above.

In FIG. 8, retracting a component 200 or a shaft 200 into an opening 301 of a housing part 300 is shown purely schematically. Here, the counterpart 3 is firmly connected to the shaft 200 by means of the attachment means 18.

The counterpart 3 is then connected to the receiving means 4 by means of the connecting means 19.

When the actuator means 7 is actuated, the tube means 5 in the exemplary embodiment shown here is also pushed forwards over the receiving means 4, wherein in such a configuration, the contact section 6 or the fitting 20 is supported against the housing part 300 and pulls the shaft 200 through the opening 301.

In the exemplary embodiment shown here, both the tube means 5 and the fitting 20 are adapted such that the shaft 200 can be retracted at least in sections into the fitting 20 and the tube means 5.

FIGS. 9 to 14 show purely schematically in three different views how a shaft 200 is retracted into the opening.

Figure 9:
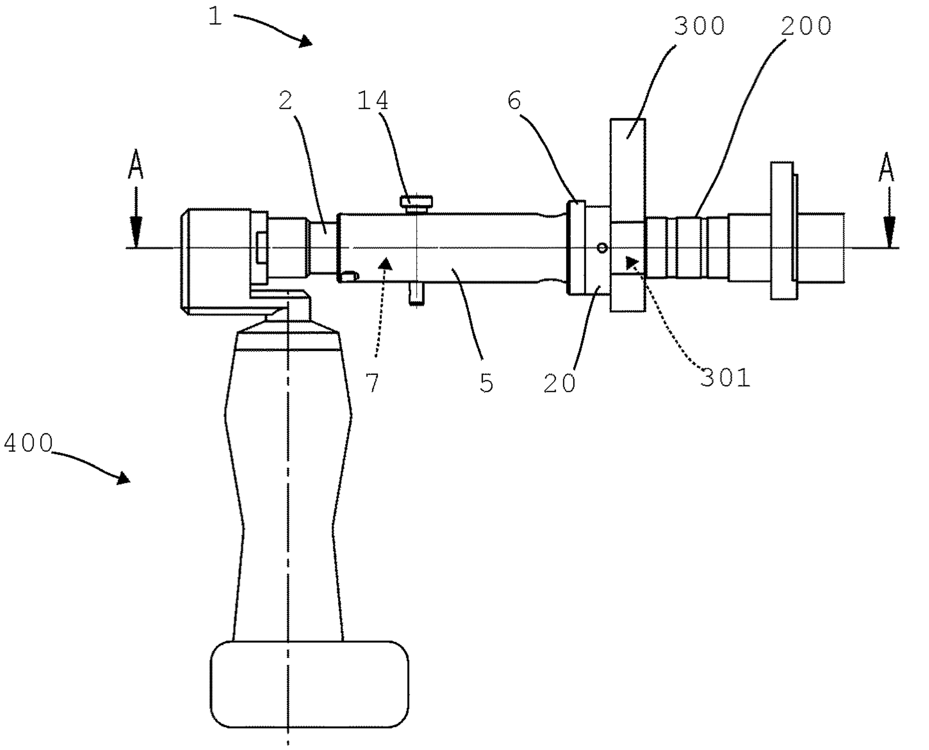
FIG. 9 shows a purely schematic illustration of an exemplary embodiment of an assembly device according to the invention at the beginning of retracting a shaft into a housing part in a view from the side.

FIG. 9 shows a side view of an assembly device 1 according to the invention, wherein a shaft 200 is arranged in front of the opening 301, wherein the counterpart 3 connected to the shaft 200 is passed through the opening 301 and inserted into the receiving means 4.

Figure 10:
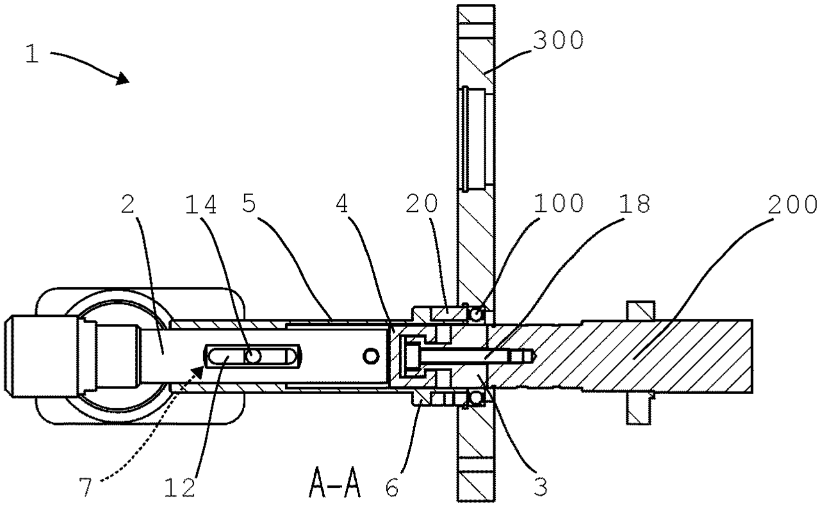
FIG. 10 shows a sectional view through the sectional plane A-A in FIG. 9.

FIG. 10 shows a purely schematic sectional view from above through the sectional plane A-A in FIG. 9. Here, the counterpart 3 connected to the shaft 200 can be seen, which is screwed into the shaft 200 by means of an attachment means 18.

The counterpart 3 is passed through the opening 301 and inserted into the receiving means 4 so that the counterpart 3 is firmly connected to the base body 2. When the actuator means 7 is actuated, the tube means 5 is pushed forward. Since the contact section 6 or the fitting 20 is supported against the housing part 300, the relative movement of the tube means 5 to the receiving means 4 or to the base body 2 causes the shaft 200 to be retracted into the opening 301, whereby the shaft or the counterpart 3 is retracted into the tube means 5.

Figure 11:
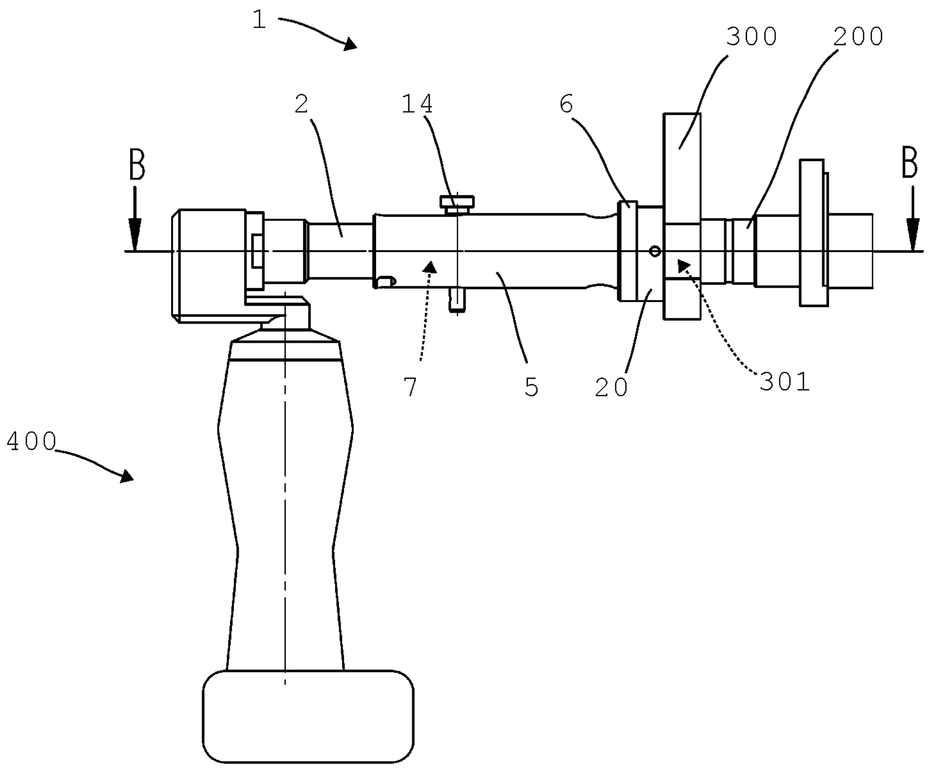
FIG. 11 shows a purely schematic illustration of an exemplary embodiment of an assembly device according to the invention when retracting a shaft into a housing part in a view from the side.
Figure 12:
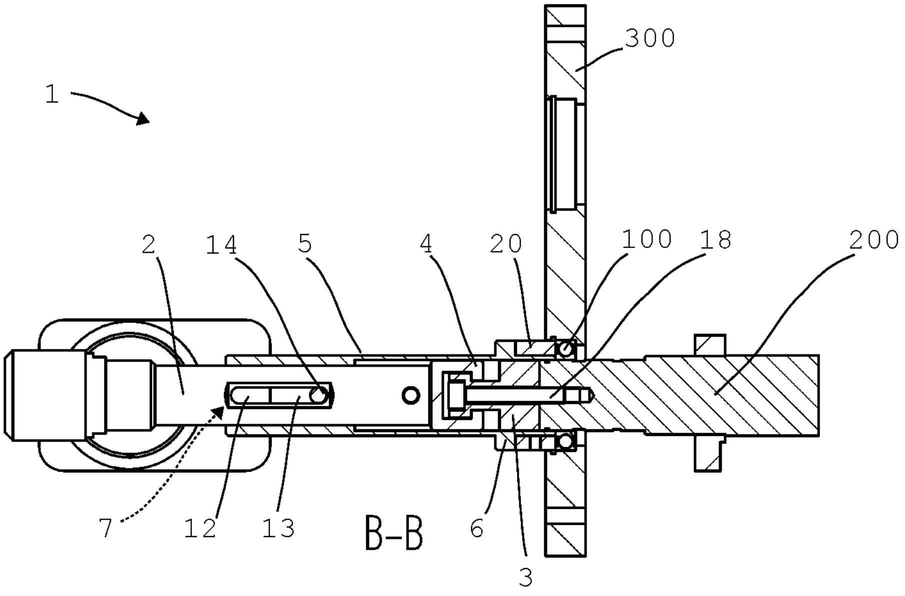
FIG. 12 shows a sectional view through the sectional plane B-B in FIG. 11.

This is illustrated in FIGS. 11 and 12, wherein in FIG. 12 a sectional view from above through the sectional plane B-B in FIG. 11 is shown. Here, it can be seen that the counterpart 3 has already been partially retracted through the opening 301 and plunges into the tube means 5 or through the fitting 20.

Figure 13:
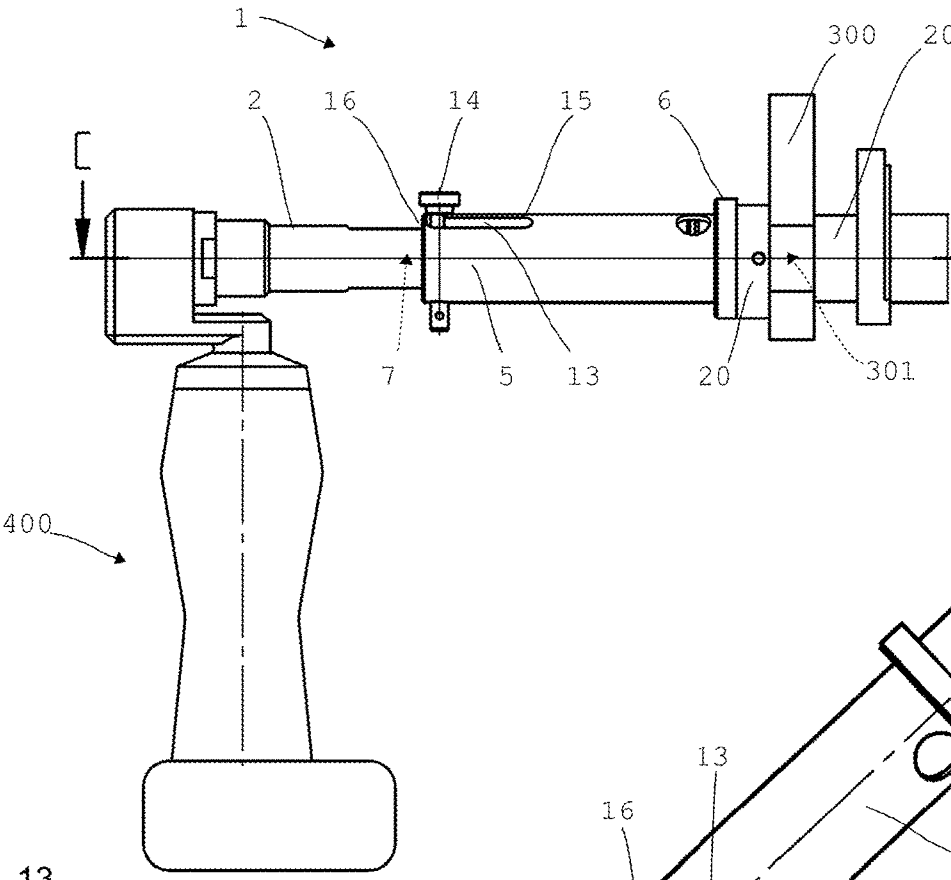
FIG. 13 shows a purely schematic illustration of an exemplary embodiment of an assembly device according to the invention with a completely retracted shaft.
Figure 14:
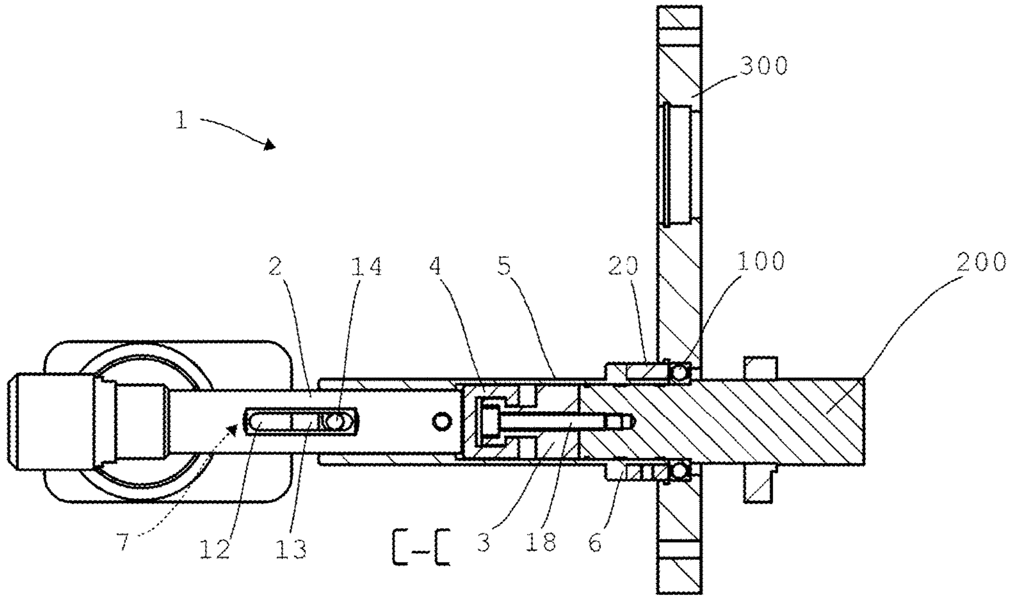
FIG. 14 shows a sectional view through the sectional plane C-C in FIG. 13.

In FIGS. 13 and 14, it is shown purely schematically that the shaft is drawn completely through the opening 301. For this purpose, the tube means 5 in the exemplary embodiment shown here is repositioned by means of a type of bayonet adjustment mechanism so that the coupling element 14 is no longer in engagement with the first engagement section 15 but rather with the second engagement section 16.

For this purpose, the actuator means 7 was first moved back, wherein subsequently the tube means 5 is rotated and is manually displaced and rotated here so that the coupling element 14 comes into engagement with the second engagement section.

When the actuator means 7 is extended again, the tube means 5 is advanced further so that the shaft 200 is retracted further or completely through the opening 301, and it can be seen in FIG. 14 that the counterpart 3 is now arranged completely in the tube means 5 with the shaft 200 also being retracted into the tube means 5 and through the fitting 20.

Figure 15:
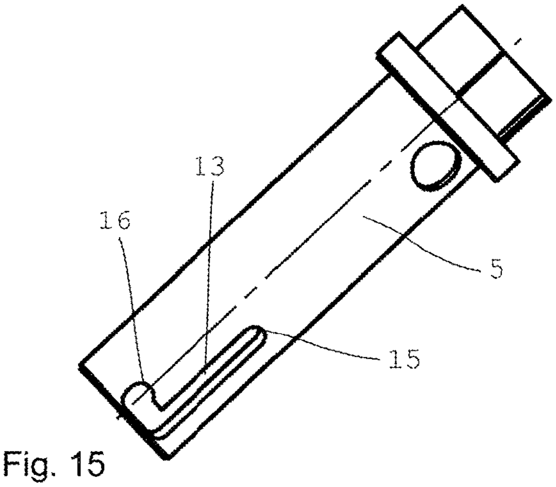
FIG. 15 shows a purely schematic illustration of an embodiment of a tube means in a perspective view.

FIG. 15 illustrates a purely schematic perspective view of an exemplary embodiment of a tube means. Here too, the bayonet adjustment mechanism can be seen, by means of which the first engagement section 15 or the second adjustment section 16 can be brought into operative connection with the actuator means 7.

Figure 16:
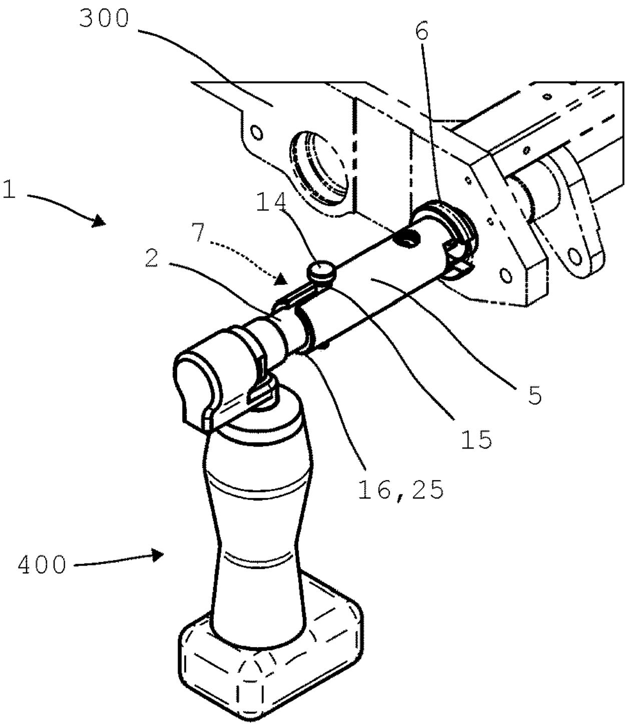
FIG. 16 shows a purely schematic illustration of a next exemplary embodiment of an assembly device according to the invention in a perspective view.
Figure 17:
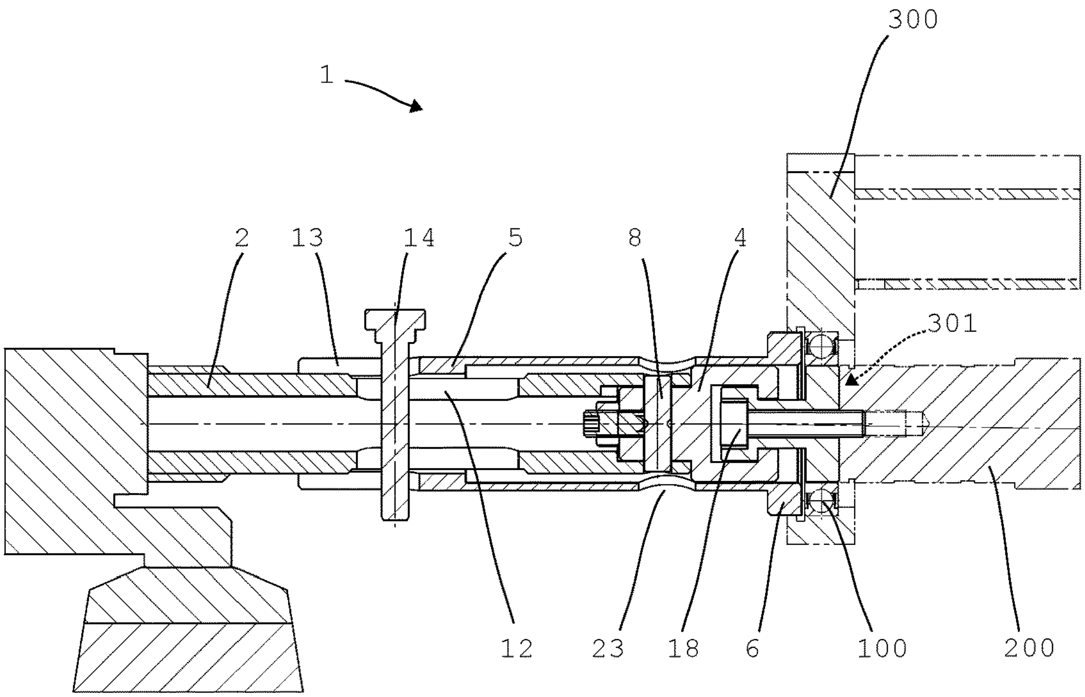
FIG. 17 shows a purely schematic sectional view through the assembly device in FIG. 16.

In FIGS. 16 and 17, a further exemplary embodiment of an assembly device 1 according to the invention is shown purely schematically. However, in the exemplary embodiment shown, no fitting 20 is provided, rather, the contact section 6 of the tube means 5 serves directly as the force-transmitting section or pressing section.

A further difference from the previously shown configurations is that the recess 13 in the tube means 5 is not formed to be closed. Here, the first engagement section 15 is provided in the recess 13. If more stroke or further displacement of the tube means 5 is required, the actuator means 7 can be moved back, wherein then the tube means 5 can also be rotated here with the coupling element 14 then pressing against the tube means 5 outside the recess 13 so that the edge 25 of the tube means 5 provides the second engagement section 16.

Depending on the configuration of the assembly device 1 or the actuator means 7 and the tube means 5, it is also possible that the adjustment between a first and a second or a further engagement section 15, 16 is not necessary. In that case, the recess 13 in the tube means 5 can also be provided as a simple through-hole, for example.

While particular embodiments of the present assembly device and method for assembling components have been described herein, it will be appreciated by those skilled in the art that changes and modifications may be made thereto without departing from the invention in its broader aspects and as set forth in the following claims.

REFERENCE LIST

1 assembly device
2 base body
3 counterpart
4 receiving means
5 tube means
6 contact section
7 actuator means
8 locking means
9 pressure cylinder/hydraulic cylinder
10 worm drive
11 threaded rod
12 recess
13 recess
14 coupling element
15 first engagement section
16 second engagement section
17 plate
18 attachment means
19 connecting means
20 fitting
21 recess
22 bolt
23 opening
24 locking means
25 edge
26 centering projection
27 stop

28 centering aid
100 component/bearing
200 component/shaft
300 housing part
301 opening
400 handling means
401 rechargeable battery
402 handle
403 actuating element

The invention claimed is:

1. An assembly device, for pressing components such as bearings and/or for retracting components such as shafts into an opening provided for a housing part for sliding on and/or pulling off components, the device comprising:

at least one base body and at least one counterpart having a connector, wherein the at least one base body has at least one receiving means for receiving the connector of the at least one counterpart, the receiving means including a receptacle configured for receiving the connector of the at least one counterpart;

at least one tube means with at least one contact section, said at least one counterpart extending outwardly from said at least one contact section of said at least one tube means, wherein said at least one tube means is movable relative to said at least one counterpart;

at least one base body recess provided at least in sections in the base body, wherein an actuator means enters into operative connection with the at least one tube means through the at least one base body recess; and at least one tube means recess provided in the at least one tube means;

wherein the tube means is slid over the base body at least in sections and the at least one tube means recess is positionally aligned with the at least one base body recess when the tube means is slid over the base body; wherein the tube means is connected to the actuator means by at least one coupling element inserted through the at least one tube means recess and into the at least one base body recess, wherein the assembly device is configured that during operation, the tube means moves at least partially over said at least one counterpart.

2. The assembly device according to claim 1, wherein the tube means is displaceable at least in sections beyond the receiving means.

3. The assembly device according to claim 1, wherein the receiving means is detachable and/or exchangeable.

4. The assembly device according to claim 1, wherein the inner diameter of the tube means is adapted at least in sections to at least one outer diameter of the base body, the receiving means or the at least one counterpart.

5. The assembly device according to claim 1, wherein the receiving means is connected to the base body via at least one locking means.

6. The assembly device according to claim 1, wherein the base body is configured at least in sections in a tube-like manner.

7. The assembly device according to claim 1, wherein the base body is formed to be rotatable at least in sections.

8. The assembly device according to claim 1, wherein a pressure cylinder, a worm drive, or a threaded rod is arranged at least in sections in the base body.

9. The assembly device according to claim 1, wherein the at least one tube means recess in the tube means is formed at least in sections as a slot.

10. The assembly device according to claim 1, wherein the at least one tube means recess in the tube means comprises at least one first engagement section and at least one second engagement section.

11. The assembly device according to claim 1, wherein the at least one counterpart comprises at least one plate.

12. The assembly device according to claim 1, wherein the at least one counterpart comprises at least one attachment means.

13. The assembly device according to claim 1, wherein the at least one counterpart and/or the receiving means comprises at least one connecting means.

14. The assembly device according to claim 1, wherein the at least one counterpart comprises at least one quick-release fastener.

15. The assembly device according to claim 1, wherein at least one fitting is provided via which in particular at least one cross-section and/or at least one contour can be adapted.

16. The assembly device according to claim 15, wherein the fitting has at least one fitting recess.

17. A method for pressing a component such as a bearing into an opening of a housing part with a device according to claim 1, wherein the method includes the following steps in a suitable sequence:

arranging a bearing in front of one side of an opening;

passing the at least one counterpart from the other side of the opening through the opening and the bearing;

connecting the at least one counterpart to the base body via the receiving means; and changing the distance between the contact section and the receiving means by means of the actuator means in order to press in the bearing.

18. The method according to claim 17, the method including the following steps at a suitable position and in a suitable sequence:

moving back the actuator means;

moving a coupling element into contact with a first engagement section of the at least one tube means recess in the tube means;

rotating the tube means and inserting the coupling element into contact with a second engagement section of the at least one tube means recess; and further changing the distance between the tube means and the receiving means by means of the actuator means.

19. A method for retracting a component such as a shaft into an opening of a housing member with a device according to claim 1, the method including following steps in suitable sequence:

attaching the at least one counterpart to the shaft;

passing the shaft through the opening;

connecting the at least one counterpart to the base body via the receiving means; and changing the distance between the contact section and the receiving means by means of the actuator means in order to retract the shaft.

20. The method according to claim 19, wherein the method includes the following steps at a suitable position and in a suitable sequence:

moving back the actuator means;

moving a coupling element into contact with a first engagement section of the at least one tube means recess in the tube means;

rotating the tube means and inserting the coupling element into contact with a second engagement section of the at least one tube means recess; and further changing the distance between the contact section and the receiving means by means of the actuator means.

21. An assembly device, for pressing components such as bearings and/or for retracting components such as shafts into an opening provided for a housing part for sliding on and/or pulling off components, the device comprising:

at least one base body and at least one counterpart having a connector, wherein the at least one base body has at least one receiving means for receiving the connector of the at least one counterpart; and at least one tube means with at least one contact section, said at least one counterpart extending outwardly from said at least one contact section of said at least one tube means, wherein said at least one tube means is movable relative to said at least one counterpart;

at least one base body recess provided at least in sections in the base body, wherein an actuator means enters into operative connection with the at least one tube means through the at least one base body recess;

wherein the tube means is slid over the base body at least in sections the tube means including at least one tube means recess that is positionally aligned with the at least one base body recess when the tube means is slid over the at least one base body, the tube means being movably connected to the base body such that the tube means moves axially and rotates relative to the base body;

wherein the tube means is connected to the actuator means by at least one coupling element inserted into the at least one tube means recess and at least one base body recess, and wherein the assembly device is configured that during operation, the tube means moves at least partially over said at least one counterpart.

22. The assembly device according to claim 1, wherein the tube means is moved by the actuator means relative to the base body and toward the housing part so that the at least one counterpart contacts the housing part and slides on and/or pulls off the components.

* * * * *